United States Patent
Atkin et al.

(10) Patent No.: US 7,493,596 B2
(45) Date of Patent: Feb. 17, 2009

(54) METHOD, SYSTEM AND PROGRAM PRODUCT FOR DETERMINING JAVA SOFTWARE CODE PLAGIARISM AND INFRINGEMENT

(75) Inventors: Steven Edward Atkin, Austin, TX (US); Margot Bruce Casey, Austin, TX (US); Tyron Jerrod Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 10/881,973

(22) Filed: Jun. 30, 2004

(65) Prior Publication Data

US 2006/0005166 A1    Jan. 5, 2006

(51) Int. Cl.
   *G06F 9/45* (2006.01)
(52) U.S. Cl. ...................................... 717/124
(58) Field of Classification Search .................. 717/124
   See application file for complete search history.

(56) References Cited

U.S. PATENT DOCUMENTS

| | | | |
|---|---|---|---|
| 3,066,181 A * | 11/1962 | Flower | 174/146 |
| 6,282,698 B1 * | 8/2001 | Baker et al. | 717/118 |
| 6,684,254 B1 * | 1/2004 | Dutta | 709/229 |
| 7,130,466 B2 * | 10/2006 | Seeber | 382/218 |
| 2004/0221264 A1 * | 11/2004 | Phenix | 717/116 |
| 2005/0010905 A1 * | 1/2005 | Noirot-Nerin | 717/121 |
| 2005/0060643 A1 * | 3/2005 | Glass et al. | 715/501.1 |
| 2005/0114840 A1 * | 5/2005 | Zeidman | 717/126 |
| 2005/0188356 A1 * | 8/2005 | Lwo | 717/120 |

OTHER PUBLICATIONS

Belkhouche et al., Plagiarism Detection in Software Designs, Apr. 2, 2004, ACM, p. 207-211.*
Johnson, M., Software Piracy: Stopping It Before it Stops You, 1988, ACM, p. 295-299.*
Lending et al., Research in Progress: The Effects of Ethical Climate . . ., 2001, ACM, p. 198-200.*

* cited by examiner

*Primary Examiner*—John Chavis
(74) *Attorney, Agent, or Firm*—Herman Rodriguez; Dillon & Yudell LLP

(57) ABSTRACT

An analysis tool extracts class data from Java objects within a potential plagiarizing Java program and the original Java program, and then compares classes common to the potential plagiarizing program and the original across various performance metrics. Similarities disclosed by the analysis tool are output for user or programmatic comparison of the matches between the potentially plagiarizing Java program byte code and the original program's byte code.

6 Claims, 8 Drawing Sheets

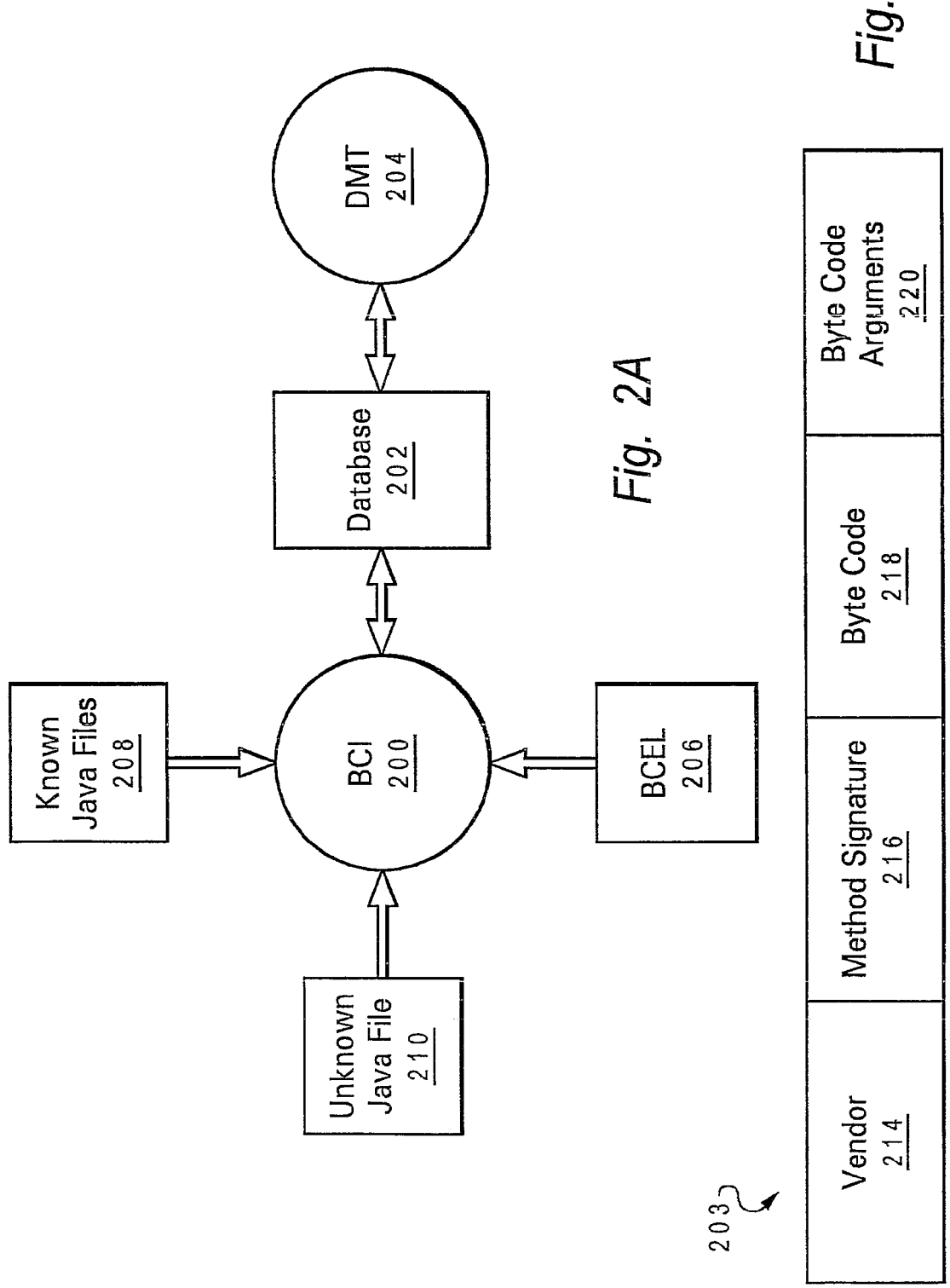

| Vendor 902 | Class 904 | Method 906 | # Lines 908 | # Native Calls 910 | # Try Catch Blocks 912 | Referred Classes 914 | ... |
|---|---|---|---|---|---|---|---|
| Original Vendor 916 | ClassLoader | findClass | 54 | 3 | 1 | 4 | |
| Compared Vendor 918 | ClassLoader | findClass | 135 | 2 | 5 | 5 | |

METHOD, SYSTEM AND PROGRAM PRODUCT FOR DETERMINING JAVA SOFTWARE CODE PLAGIARISM AND INFRINGEMENT

CROSS-REFERENCE TO RELATED APPLICATIONS

The present application is related to the following co-pending U.S. patent applications filed on even date herewith, and incorporated herein by reference in their entirety:

Ser. No. 10/881,967, entitled "METHOD, SYSTEM AND PROGRAM PRODUCT FOR DETERMINING STANDARD JAVA OBJECTS"

Ser. No. 10/881,969, entitled "METHOD, SYSTEM AND PROGRAM PRODUCT FOR EVALUATING JAVA SOFTWARE BEST PRACTICES ACROSS MULTIPLE VENDORS"

Ser. No. 10/881,968, entitled "METHOD, SYSTEM AND PROGRAM PRODUCT FOR OPTIMIZING JAVA APPLICATION PERFORMANCE THROUGH DATA MINING"

BACKGROUND OF THE INVENTION

1. Field of the Invention

The present invention relates to computer systems, software architectures and programs, and more particularly to a method, system and computer program product for evaluating Java programs to determine code plagiarism.

2. Description of the Related Art

Java is a robust, portable object-oriented programming language developed by Sun Microsystems, Inc., that is gaining wide acceptance for writing code for the Internet and World Wide Web (hereinafter, "Web"). The nature of Java programming allows programmers to easily decompile Java code and review its source code. As such, competitors are able to obtain software from other vendors and review their source code as part of their process of developing their own Java programs. It is a simple matter for the Java source code itself to be copied into the new software program being developed. This copying of the Java source code infringes on the copyright of the original author of the Java source code. Unfortunately, there are few tools available to discover such code plagiarism, and the typical detection devices that are available are easily fooled when the plagiarizing source code is slightly modified or changed from the original source code.

This difficulty in detecting code plagiarism is further complicated when source code for the infringing software is not available. There are a variety of this obfuscation programs that limit access to source code of a program. Without viewing the original source code, it is extremely difficult to determine if program code has been copied. Using artificial intelligence algorithms, software can analyze source code for keywords, patterns, and compare them to known software programs. If duplication of a known software program is found within a certain probability, the new code is considered to be copied or duplicated. However, such a technique has hereto only been capable of detecting such patterns in source code.

Accordingly, it would be valuable to provide a tool for detecting code plagiarism and intellectual property infringement of a java program, even when the original code has been modified somewhat by the plagiarist. Such a tool would have particular value if you could detect code plagiarism even if the Java source code was not available.

SUMMARY OF THE INVENTION

In accordance with one embodiment of the present invention, an analysis tool extracts class data from a potentially infringing software program and an original program, and then determines what class data of the software program matches the class data from the original software program. The analysis tool then outputs the comparison as a function of class data. The tool or user can then determine the similarity of the software program to the original software program based on the comparison output.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows:

FIG. 2A a block diagram of a software architecture for system, in accordance with the preferred embodiment of the present invention.

FIG. 2B is a logical block diagram of a Java file method entry in a database, in accordance with the preferred embodiment of the present invention.

DETAILED DESCRIPTION OF PREFERRED EMBODIMENTS

In a preferred embodiment, the present invention provides a facility to analyze Java byte code to determine if the code has been plagiarized from another source program. This is accomplished by an analysis tool performing a pre-analysis to train itself on particular programming metrics of the original program, and then performing a dynamic analysis of the potentially plagiarizing or infringing Java program to determine if its byte code matches the criteria or programming metrics extracted from the original program's byte code. The function of the analysis tool in a typical software environment is described below.

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a Java software system, it will be appreciated that the present invention is not limited to Java implementations.

Figure 1:
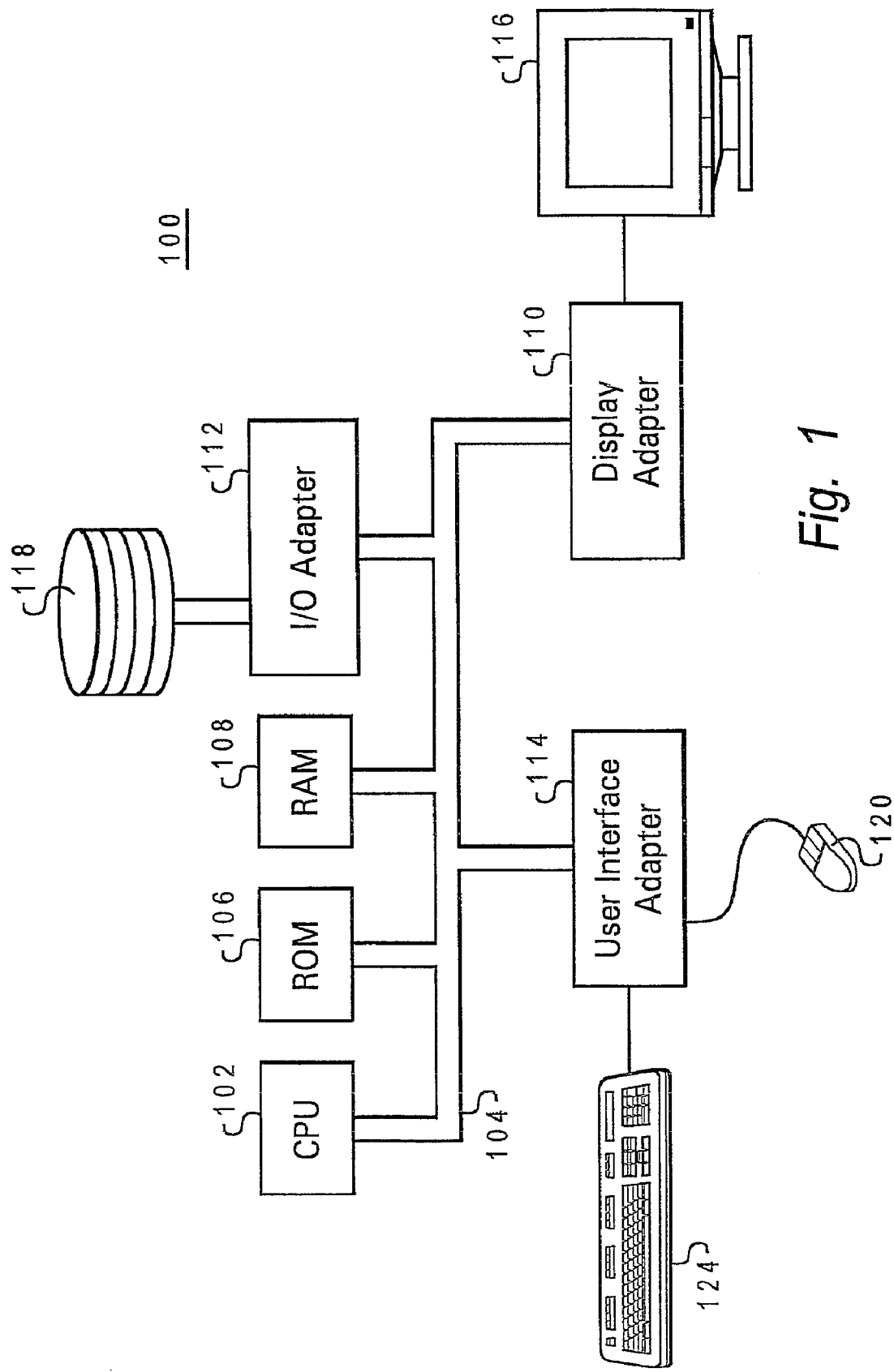
FIG. 1 is a block diagram of a general-purpose computer system to which the present invention may be applied.

FIG. 1 is a block diagram of a general-purpose computer system 100 to which the present invention may be applied. The computer system 100 includes at least one processor (CPU) 102 operatively coupled to other components via a system bus 104. A read only memory (ROM) 106, a random access memory (RAM) 108, a display adapter 110, an I/O adapter 112, and a user interface adapter 114 are coupled to system bus 104.

Display adapter 110 operatively couples a display device 116 to system bus 104. A disk storage device (e.g., a magnetic or optical disk storage device) 118 is operatively coupled to system bus 104 by I/O adapter 112. User interface adapter 114 operatively couples a mouse 120 and keyboard 124 to system bus 104. One or more objects are created when an Object-Oriented Program (not shown) is executed in computer system 100.

The present invention has particular utility in Java applications. Java is a robust, portable object-oriented programming language developed by Sun Microsystems, Inc. Java attains its portability through use of a virtual machine or "Java Virtual Machine", or "JVM". The JVM enables isolating the details of the underlying hardware from the compiler used to compile the Java programming instructions.

Java applications are typically constructed using a development toolkit such as the "JDK" (Java Development Kit) product from Sun Microsystems, and are executed using the "JRE" (Java Runtime Environment) product, also from Sun Microsystems. Programs are executed from the command line when using the JRE. The Java Runtime Environment includes the JVM, as well as a number of files and classes that are required to run Java applications or applets. Hereinafter, the terms "JVM" and "runtime environment" will be used interchangeably unless otherwise noted.

Java program source code typically consists of a set of class definitions stored in a series of text files. A Java class contains both methods and data. Java source code is compiled into binary code, referred to as Java "byte code." Byte codes are machine independent so that they can be executed on any machine's JVM, where the JVM is tailored to the specific operating environment. After the source code files are compiled into Java byte code class files, they are then typically loaded into memory by a class loader for interpretation by a JVM interpreter before the associated program is executed. Class loading can also occur when a Java program dynamically attempts to load another class at run time. The Java class loader uses a predetermined search strategy when locating class files, which gives precedence to particular locations. According to the Java 1.2 platform specification, the highest priority search locations are the bootstrap run time and internationalization classes in the JRE, named "rt.jar" and "I18N.jar," respectively. The Java Archive (JAR) or ".jar" file is a repository that contains one or more Java class files and is simply called a "Java jar" or "JAR". JAR files provide compression, backward compatibility with existing Java applets, portability, and security features.

With reference now to FIG. 2A, there is shown a block diagram of a software architecture for computer system 100, in accordance with the preferred embodiment of the present invention. In a preferred embodiment, an analysis tool written in Java, called the Byte Code Inspector (BCI) 200, is executing in CPU 102. BCI 200 accesses database 202, which is contained within disk storage device 118, for the storage and retrieval of analysis data. Database Mining Tool (DMT) 204 is also executing in CPU 102. In a preferred embodiment, a commercially available database mining tool such as Enterprise Miner produced by SAS, Inc. may implement DMT 204.

BCI 200 decompiles a known Java class or JAR file (known Java files 208) to extract specific method information to be placed in database 202. FIG. 2B is a logical block diagram of a Java file method entry 203 in database 202. In a preferred embodiment, method entry 203 stores method information for a specific class of a Java file, including the vendor 214, method signature 216, byte code 218 and byte arguments 220. A number of method entries 203 are created in database 202 corresponding to each Java class contained in known Java files 208.

Figure 2C:
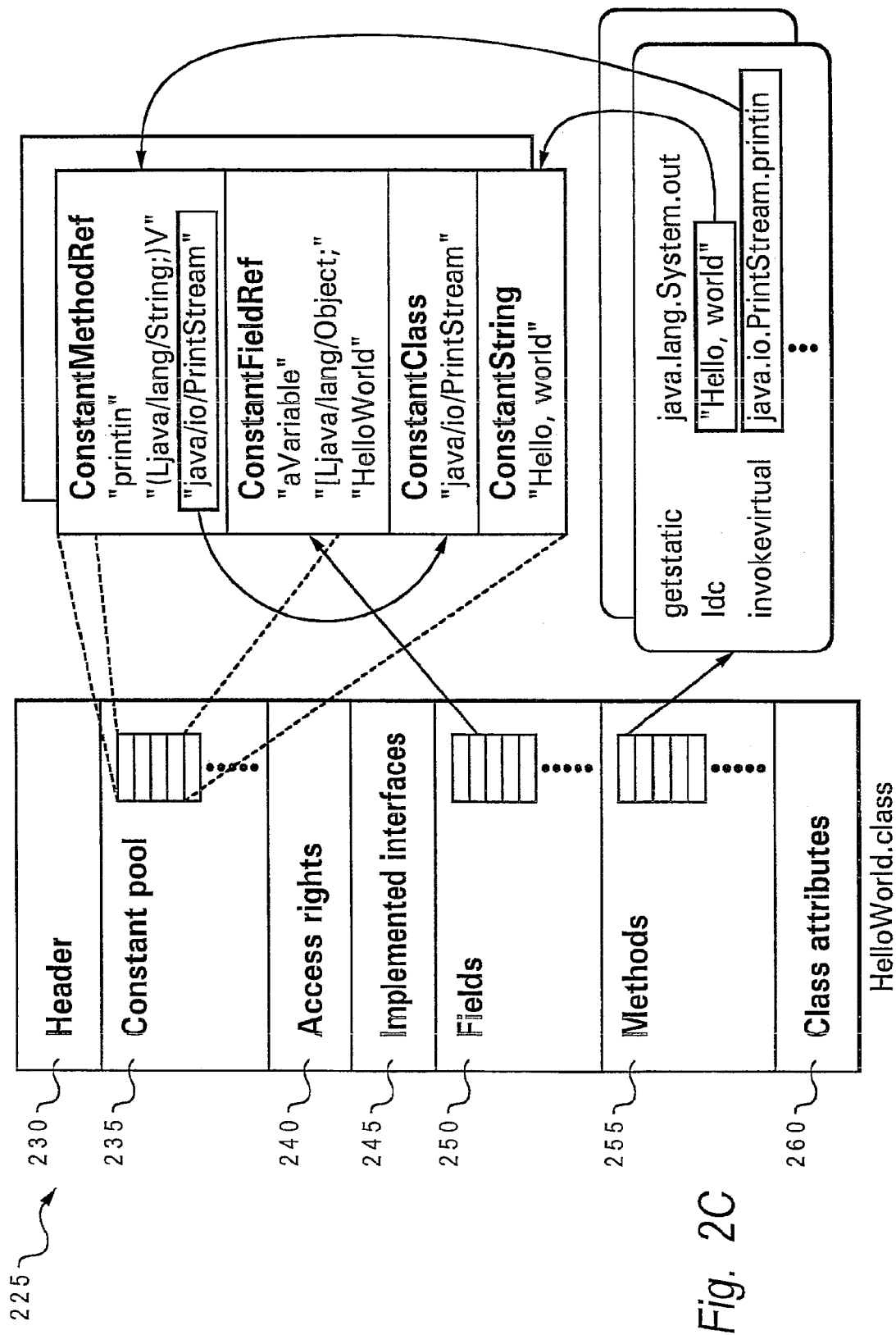
FIG. 2C shows a graphical representation of a Java class file as viewed by the Byte Code Engineering Library.

BCI 200 retrieves methods of a class being analyzed from a commercially available toolkit called the byte code engineering library (BCEL) 206. In a preferred embodiment, BCI 200 has been implemented using a publicly available byte code engineering library such as the open source Byte Code Engineering Library, which is available from The Apache Software Foundation on the Internet at http://jakarta.apache.org/index.html. This library is used to separate a Java class file into its constituent parts. FIG. 2C shows a graphical representation of a Java class file as viewed by the BCEL 206. As can be seen in FIG. 2C, the library separates the byte code for class 225 into various attributes, including a header 230, constant pool 235, access rights 240, implemented interfaces 245, fields 250, methods 255 and class attributes 260.

Figure 3:
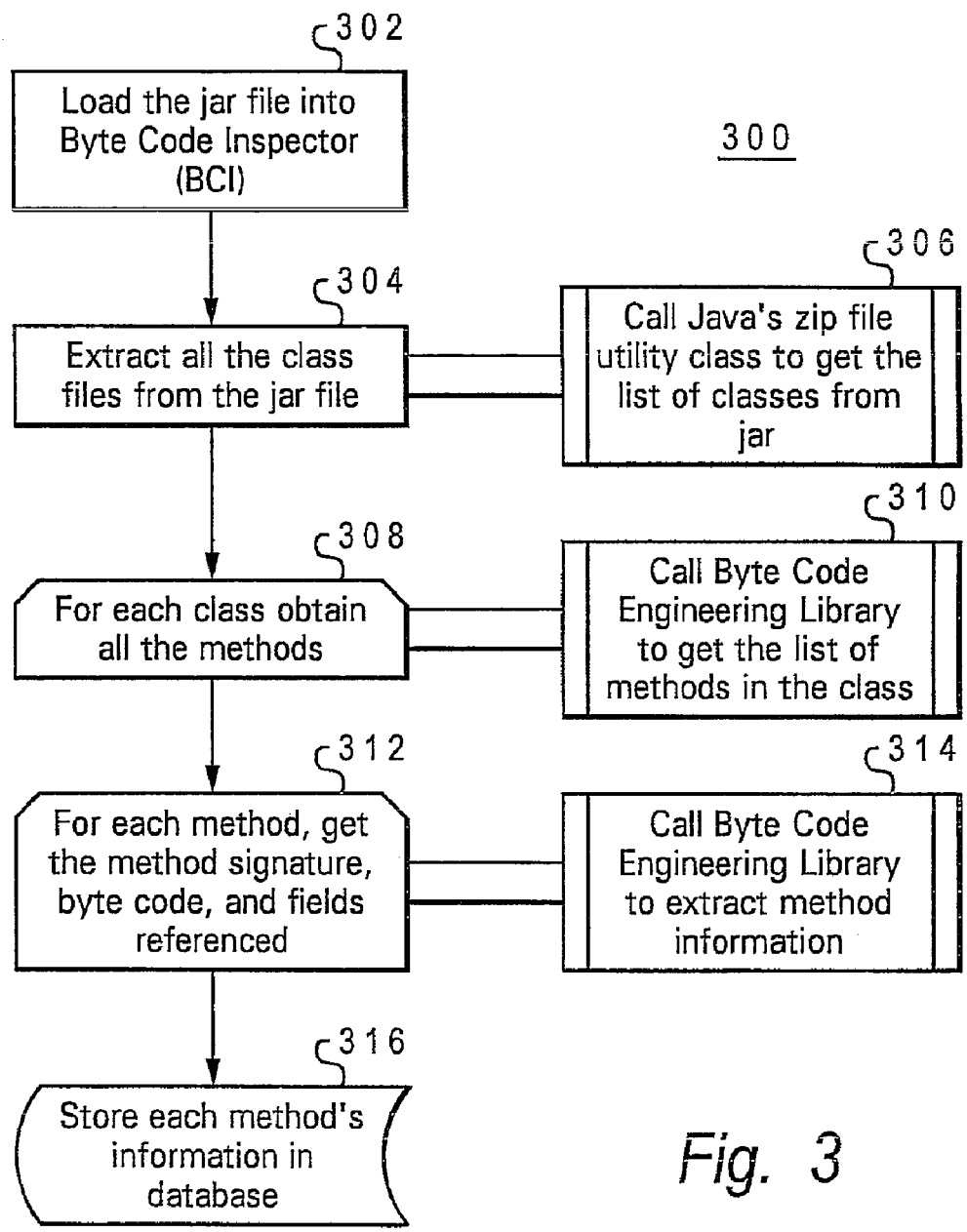
FIG. 3 is a flow diagram of a process for decompiling a Java archive that contains Java classes for use in the pre-analysis process, in accordance with the preferred embodiment of the present invention.

With reference now to FIG. 3, there is shown a flow diagram of a process implemented by BCI 200 for unpacking a Java archive for use in the pre-analysis process 800 (see FIG. 5), in accordance with the preferred embodiment of the present invention. As shown in FIG. 3, process 300 begins at step 302, when the user loads the known Java files 208 into BCI 200. At step 304, BCI 200 extracts all class files contained in the known Java files 208 by calling Java's zip file utility class (shown at 306) to obtain the list of classes from the known Java files 208. At step 308, BCI 200 obtains all methods for each class extracted from the known Java files 208 (at step 304) by calling the BCEL 206 to get the corresponding list of methods known to be contained within each class (shown at 310). At step 312, BCI 200 extracts the method signature, byte codes, byte arguments and other fields for each method (shown at 314) by calling the BCEL 206. Thereafter, process 300 ends at step 316, when BCI 200 stores the method information 214-220 for each method of each class extracted at step 312 in database 202 within method entry 203.

Figure 4:
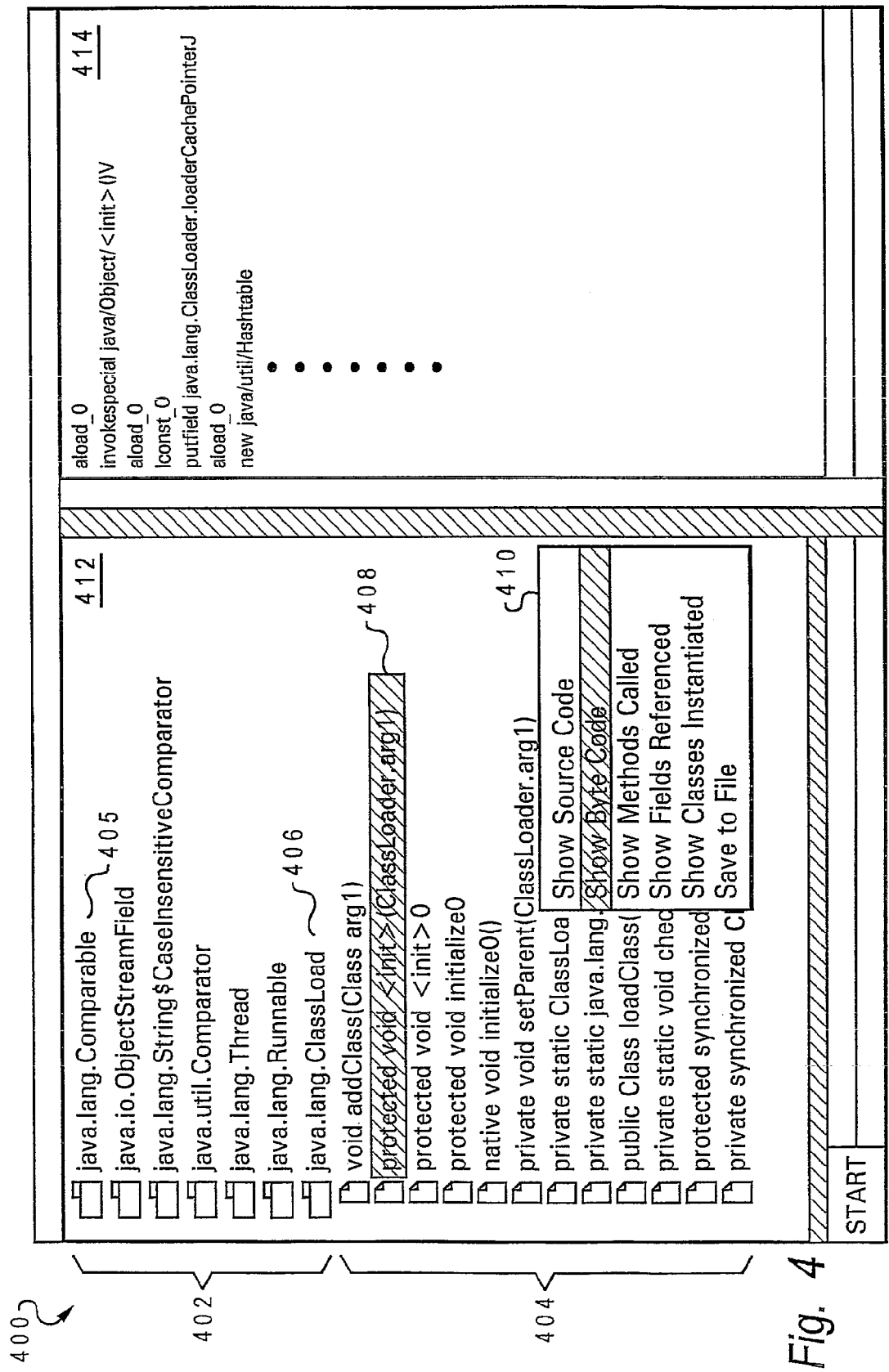
FIG. 4 shows a screen shot of the graphical user interface of the Byte Code Inspector tool, in accordance with the preferred embodiment of the present invention.

FIG. 4 shows a screen shot of the graphical user interface window (GUI) 400 of BCI 200. FIG. 4 shows an example where "rt.jar" has been decompiled by BCI 200 to extract all class files 402 within the rt.jar archive, and then to further extract all methods 404 within the class files 402. For example, the "java.lang.Comparable" 405 and "java. lang. ClassLoader" 406 class files 402 are shown within left windowpane 412. Additionally, the "java.lang.ClassLoader" class 406 is shown expanded in the GUI 400, thereby listing all of its methods 404 below the expanded class file 406. For example, the "protected void <init>(ClassLoader arg1)" method 408 is listed as one of the methods 404 of the ClassLoader class 406. All byte codes extracted from the user-selected method in the left hand windowpane 412 of the GUI 400 are listed in the right hand windowpane 414. For example, as shown in FIG. 4, if the user selects the "protected void <init>(ClassLoader arg1)" method 408 (e.g., using a mouse) the constituent byte codes are shown in the right hand windowpane 414.

Figures 5, 6:
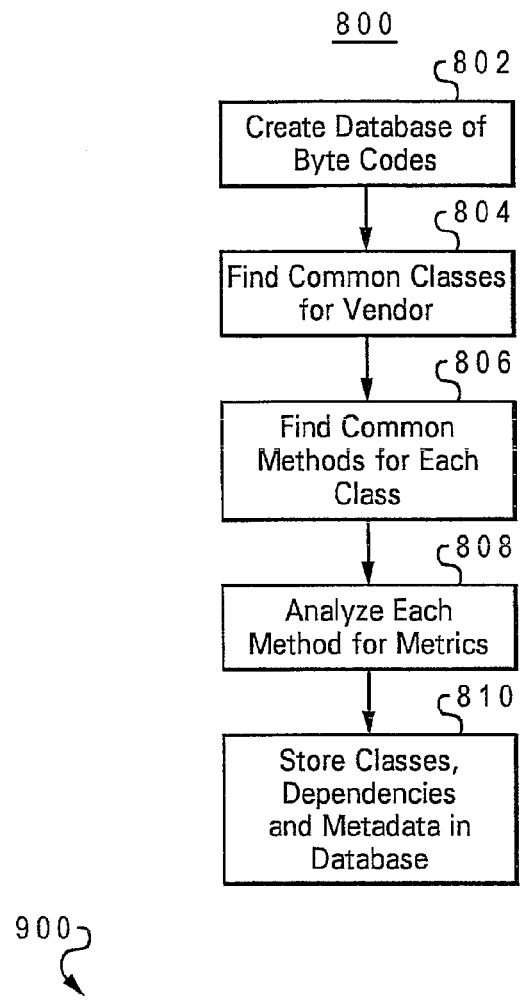
FIG. 5 shows a flow diagram for evaluating the original program's and the potential infringer's implementations of a Java class, in accordance with a preferred embodiment of the present invention.
FIG. 6 shows an example of database entries indicating various design metrics associated with the potentially plagiarizing Java program and the original program, in accordance with a preferred embodiment of the present invention.

With reference now to FIG. 5, there is shown a flow diagram for evaluating the original program's and the potential infringer's implementations of a Java class, in accordance with a preferred embodiment of the present invention. In a preferred process, a common Java class is selected from among the byte code of each program for analysis. As seen in FIG. 5, process 800 begins at step 802, where a database (database 202) of byte codes for the program to be analyzed is created. In a preferred embodiment, a BCEL from an open source provider may be accessed to provide the byte code database for the potential infringing program. At step 804, BCI 200 extracts one or more classes that are common to the two programs from byte code database 202. In a preferred embodiment, a rt.jar for each program (known Java files 208) is accessed. Then, at step 806, BCI 200 performs process 300 to find all the methods that are common for each of the vendor implementations within each of the classes identified at step 804. Here, using the database created in step 802, BCI 200 breaks the byte codes of the found methods into multiple pieces, whereby method attributes are stored in association with the original vendor program and the potential infringing program in database 202.

At step 808, BCI 200 analyzes each of the methods found in step 806 for programming metrics of interest, for example, such as size of the code, security implemented, performance provided, etc. At step 810, each of the analyzed classes, dependencies and metadata are stored in a database. FIG. 6 shows an example of database 202 entries indicating the type of data stored at step 810. The database 900 shows data for the original vendor's program 916 and the compared vendor's program 918, and shows columns for vendor 902, class 904, method 906, number of lines of code 908, number of native cells 910, number of try/catch blocks 912, and number of referred classes for the analyzed program 914, etc., for example.

Figure 7:
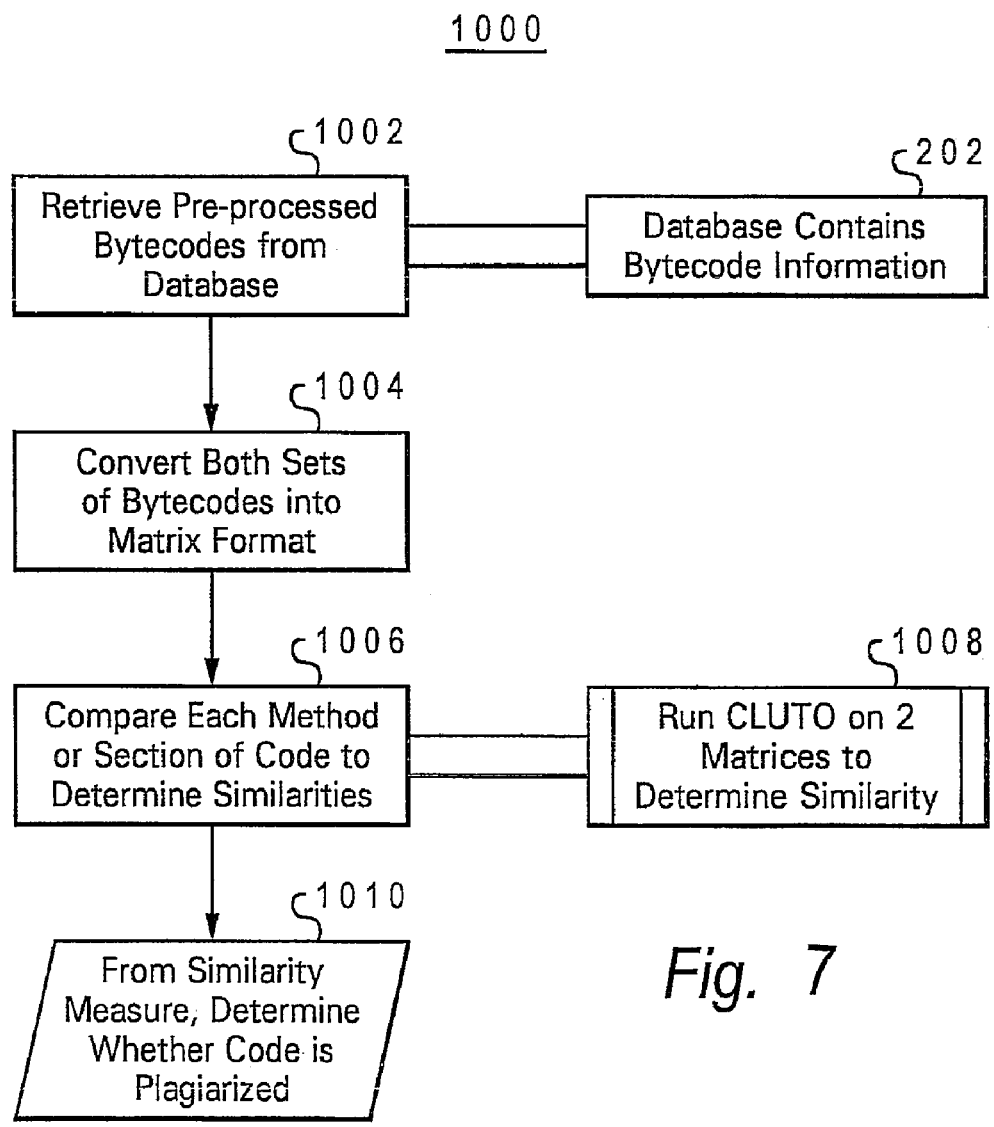
FIG. 7 shows a flow diagram of a process for comparing a vendor's program with an original program to determine if the vendor's program plagiarizes source code of the original program, in accordance with a preferred embodiment of the present invention.

With reference now to FIG. 7, there is shown a flow diagram of a process for comparing a vendor's program with an original program to determine if the vendor's program plagiarizes source code of the original program, in accordance with an alternative preferred embodiment of the present invention. Process 1000 begins at step 1002, where the preprocessed byte code information from each of the original vendor program and the vendor program to be compared are retrieved from database 202 by BCI 200. At step 1004, BCI 200 converts the retrieved byte code information into a matrix format to facilitate a comparison of the byte codes. In a preferred embodiment, BCI 200 complies the byte code information stored within database 202 into a table or matrix, for example, in the form of FIG. 6. At step 1006, BCI 200 performs a comparison of each common method within the matrix 900. For example, each common method shown in column 906 of FIG. 6 is compared at step 1006. As shown in FIG. 6, the "findCLASS" method would be compared between the original vendor (Row 916) with the compared vendor (Row 918). For each method compared at step 1006, BCI 200 would execute some type of text mining algorithm (signified by function 1008) on the two matrixes for each of the common methods for the two programs (original and compared) to determine similarities between the methods. In a preferred embodiment, a clustering tool kit (CLUTO) that operates by running clustering algorithms on the byte codes is utilized for this step. At step 1008, the actual byte code that comprises the methods being compared is loaded in the text mining tool to determine similarities (based on clustering, classification, association, etc.).

Figure 8:
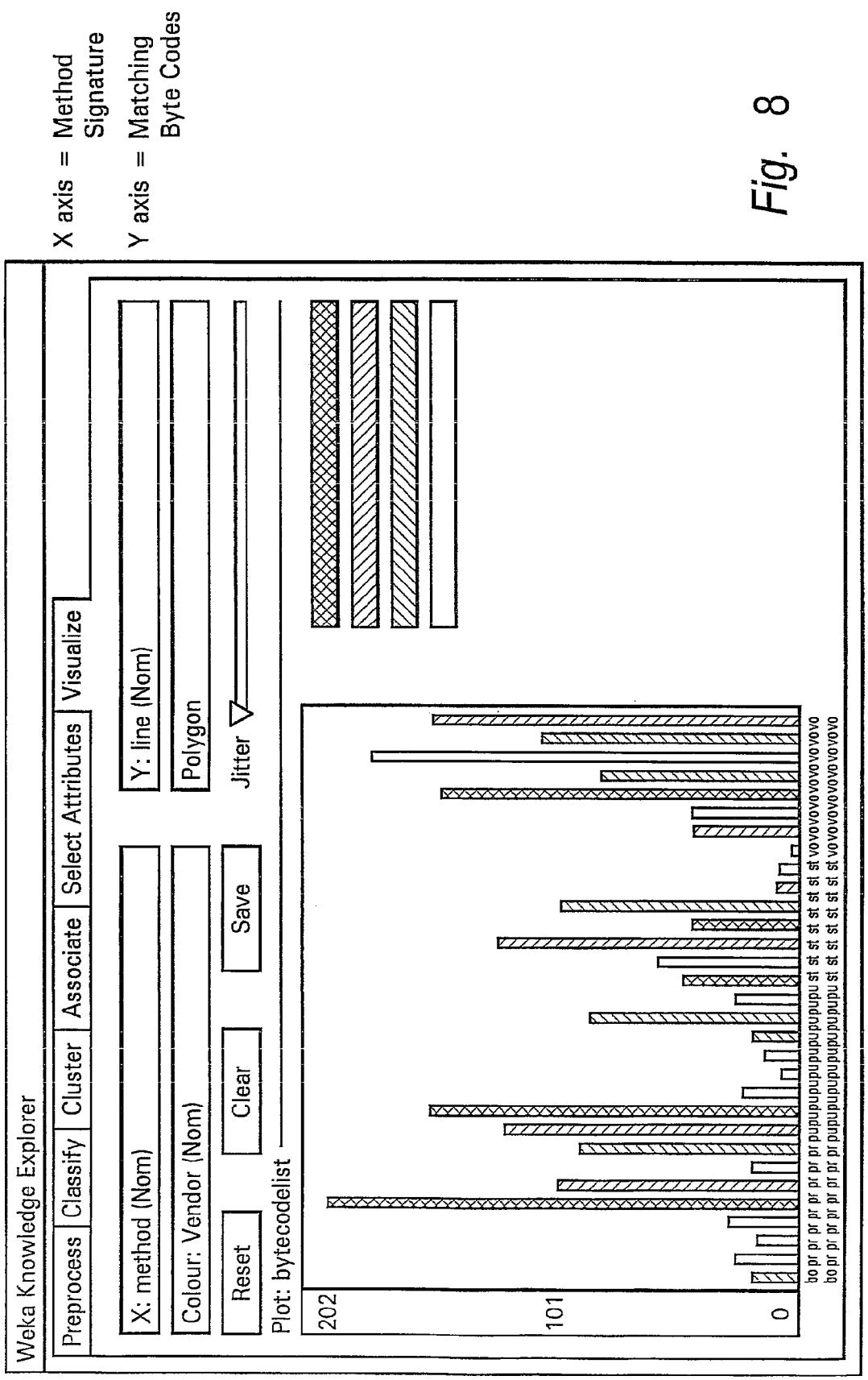
FIG. 8 shows an example of an output of such a visualization tool showing the methods compared and the number of matching byte codes for each such method across the two compared programs, in accordance with the preferred embodiment of the present invention.

Thereafter, the process proceeds to step 1010, where BCI 200 determines the similarity between the compared codes based on the detected similarities at step 1008. BCI 200 would demonstrate the similarities at step 1010 by generating a visual representation of the comparison using a visualizing tool. For example a WEKA machine learning GUI tool could be used. FIG. 8 shows an example of an output of such a WEKA visualization tool showing the methods compared and the number of matching byte codes for each such method across the two compared programs. By viewing the processed information, segments of code can be analyzed according to similarities. If code segments are within a "threshold of similarity", for example, a threshold number of identical byte codes shown in the vertical axis of FIG. 8, the methods can be considered duplicated. As will now be appreciated, because this analysis is performed on top of compiled Java code, the semantic space has been limited so that false positives and false negatives are reduced, and the process has a higher degree of accuracy of determining duplicated code.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention. While this invention is described in terms of the best mode for achieving this invention's objectives, it will be appreciated by those skilled in the art that variations may be accomplished in view of these teachings without deviating from the spirit or scope of the present invention.

What is claimed is:

1. A method for evaluating Java software to determine similarity with other Java software, the method comprising the steps of:
   extracting class data from compiled code of a software program;
   extracting class data from an compiled code of an original software program;
   determining class data of the software program matching the class data from the original software program;
   outputting the comparison as a function of class data; and
   determining a similarity of the software program to the original software program based on the comparison output;
   wherein the determining occurs even if a Java source code is not available for at least the software program.

2. The method according to claim 1, wherein:
   the class data includes method signatures, byte codes and byte arguments; and
   the method further comprises storing the class data in a database.

3. The method according to claim 1, wherein the software programs are determined to be similar according to user input based on the comparison output.

4. The method according to claim 1, wherein:
   the software programs are determined to be similar according to statistical analysis based on the comparison output; and
   the method further comprises:
      compiling the information for each software program into a matrix to facilitate the comparison
      executing a text mining algorithm on the matrix for each common method of both the software program and original software program to determine similarities between the two methods, wherein the text mining algorithm determines similarities based on one or more of clustering, classification, and association) performs.

5. The method according to claim 1, further comprising the step of extracting class data from Java objects in the software program, wherein the analysis is performed on top of complied Java code and the semantic space is limited to reduce an occurrence of false positives and false negatives and provide a higher degree of accuracy in determining duplicated code.

6. The method according to claim 1, wherein the class data is taken directly from a binary class file for an object in the software program.

* * * * *